July 25, 1944.    R. W. BROWN    2,354,448
FRICTION DEVICE
Filed Jan. 12, 1943    2 Sheets-Sheet 1

INVENTOR
Roy W. Brown
BY
ATTORNEYS

July 25, 1944. R. W. BROWN 2,354,448
FRICTION DEVICE
Filed Jan. 12, 1943 2 Sheets-Sheet 2
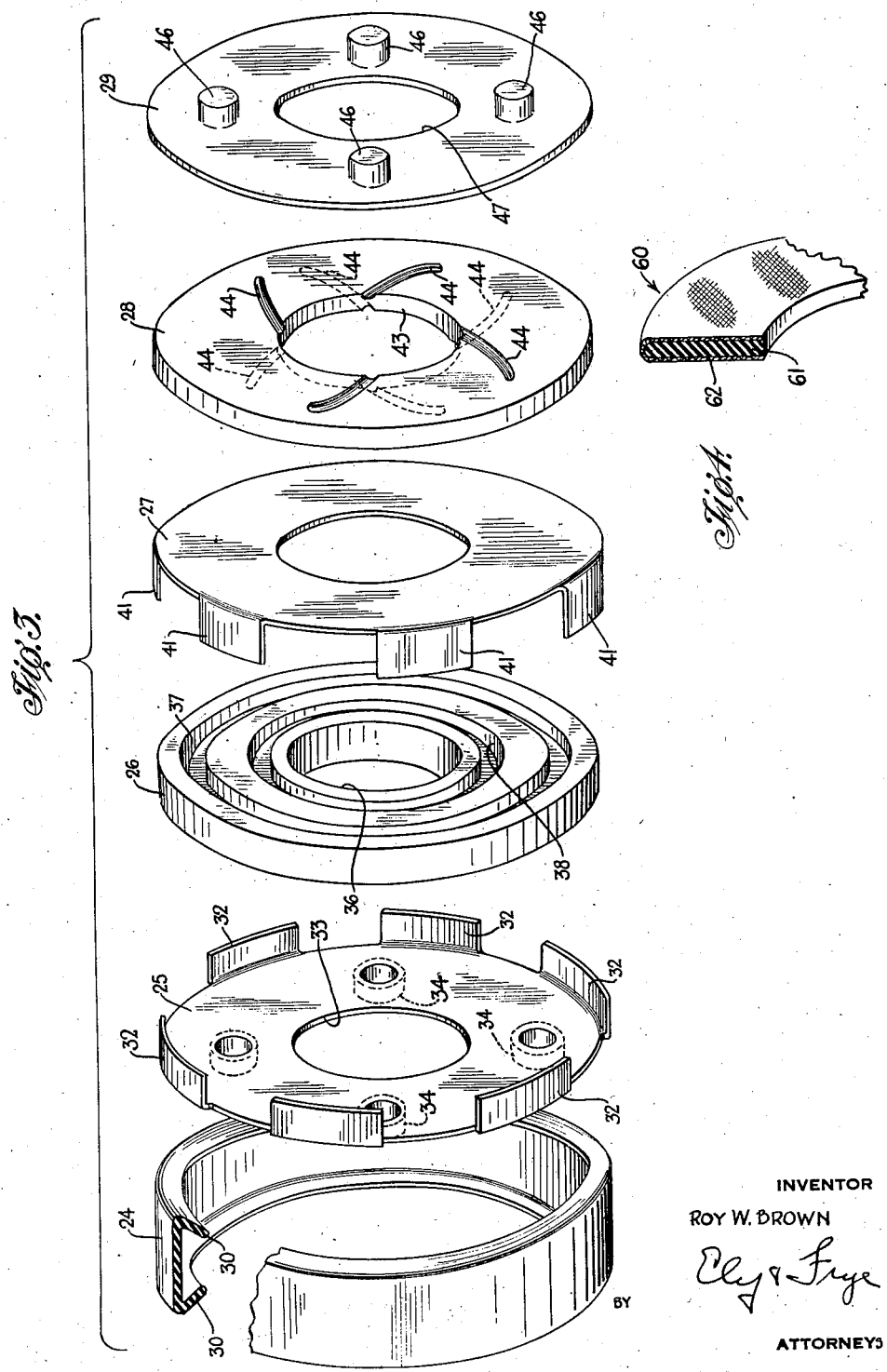
INVENTOR
ROY W. BROWN
BY
ATTORNEYS Patented July 25, 1944

2,354,448

UNITED STATES PATENT OFFICE 2,354,448

FRICTION DEVICE

Roy W. Brown, Akron, Ohio, assignor to The Firestone Tire & Rubber Company, Akron, Ohio, a corporation of Ohio Application January 12, 1943, Serial No. 472,152

11 Claims. (Cl. 188—130)

This invention relates to friction devices for opposing angular movement between two relatively movable members, and more especially it relates to devices for frictionally opposing torque between two adjacent members movable relatively of each other about an axis.

The device has a wide range of utility, being especially adapted for use in oscillating joints in parallelogram linkages employed in individual wheel suspensions for motor vehicles. Such suspensions may be of the conventional "knee action" type, or they may be of pneumatic type such as shown in my prior U. S. Patent No. 2,208,537, issued July 16, 1940.

The chief objects of the invention are to provide in an improved manner for frictionally resisting relative movement of the elements of oscillating joints; to provide a friction device comprising means for compensating for wear of the friction elements thereof; to provide for the excluding of dirt and other foreign matter from the device; to provide for lubrication of the device; and to provide in an improved manner for obtaining a relatively large area of frictionally engaged surfaces in a relatively small and compact device. Other objects will be manifest in the following specification taken in conjunction with the accompanying drawings.

Of the accompanying drawings:

Fig. 3 is an exploded view showing the several elements of a friction device in perspective; and Fig. 4 is a fragmentary sectional perspective view of a modified embodiment of one of the elements of the invention.

Figure 1:
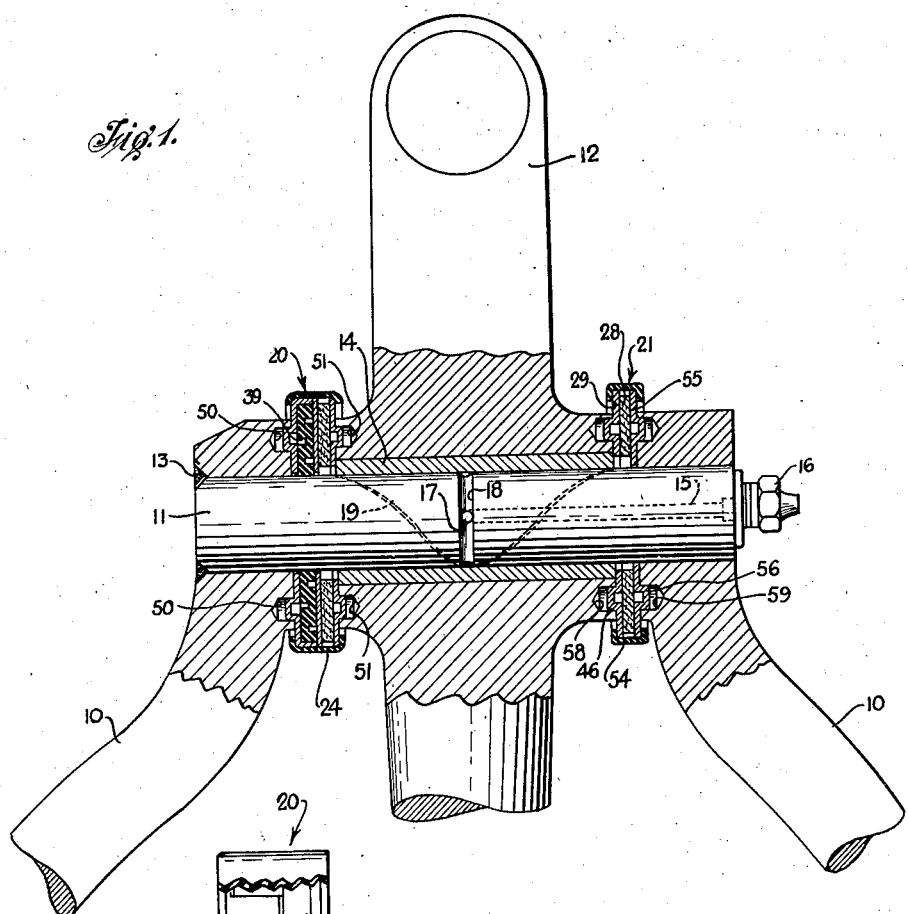
Fig. 1 is a transverse section through an oscillating joint, and a pair of friction devices embodying the invention operatively associated therewith.

Referring to Fig. 1 of the drawings, there is shown an oscillating joint comprising a pair of arms or links, 10, 10, a pivot pin 11 carried by said arms at the ends thereof, and a member 12 pivotally mounted upon the pivot pin 11. In parallelogram linkages employed for individual vehicle wheel suspensions, the member 12 may comprise an axle (not shown) upon which a vehicle wheel is journaled. As shown, the pin 11 is permanently attached to one of the links 10 by welding shown at 13, but other well-known means for mounting the pin non-rotatably in the links may be employed if desired. Mounted upon the pin 11, between the latter and the member 12, is the usual tubular bearing bushing 14. For lubricating the said bushing, the pin 11 is formed with an axial bore 15 that terminates at one end on an end face of the pin, and is threaded thereat to receive a grease cup, or a grease-gun fitting 16 as shown. At its inner end the axial bore 15 intersects a radial bore 17 that opens into a circumferential groove 18 on the periphery of the pin, midway between the ends thereof. The inner or bearing face of the bushing 14 is formed with a helical groove 19 extending from end to end thereof adapted to conduct lubricant from the groove 18 to the respective ends of said bushing, and to lubricate the contacting surfaces of bushing and pin. Mounted upon the pin 11, between one side of the hub portion of member 12 and the adjacent face of a link 10 is a friction device embodying the invention and designated as a whole by the numeral 20. Similarly positioned on the opposite side of the member 12 is somewhat modified friction device, designated as a whole by the numeral 21.

Figure 2:
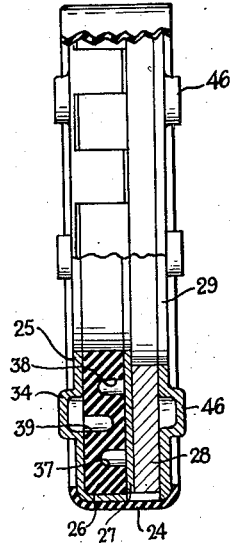
Fig. 2 is an edge view, on a larger scale, of a friction device embodying the invention, a part thereof being in section and a part being in elevation.

The construction of friction device 20 and the elements thereof is best shown in Fig. 2 and Fig. 3. Referring to the figures it will be seen that the device comprises a plurality of circular, axially apertured disc-like elements disposed in laterally abutting relation in axial alignment, said elements being consecutively designated 24, 25, 26, 27, 28 and 29 respectively. The member 24 is a relatively wide endless band of elastic material such as rubber or rubber-like composition, and is formed on its lateral margins with integral circumferential flanges 30, 30 that extend inwardly of the ring and converge somewhat toward each other. The band 24 is adapted to circumscribe and tightly embrace the other elements of the device and to this end has somewhat smaller inside diameter than the outside diameter of the largest of the other elements 25 to 29 inclusive. Furthermore, the width of the band 24 between flanges 30, in unstressed condition, is less than the total thickness of the operatively assembled elements 25 to 29 so that when the band is circled about the assembled discs the said flanges are under tension and thus normally exert an axially directed, compacting force upon the assembly. The band 24 also serves to exclude water, dirt, and other foreign matter from the device.

The member 25 is an annular sheet metal disc formed on its periphery with a plurality of laterally extending flanges 32, 32 that are shown herein as six in number. All flanges 32 extend in the same direction, and are of uniform length and are equally spaced from each other. The axial aperture 33 of the disc is adapted to admit the pivot pin 11 with but slight clearance. Between its aperture 33 and its perimeter, the disc 25 is formed with a plurality of dowels or bosses 34, 34 herein shown as four in number. The dowels 34 are symmetrically arranged, and project laterally from the disc in the opposite direction from the flanges 32. They may be formed on the disc by a simple embossing operation.

The member 26 is an annular disc composed of resilient rubber or rubber-like composition of a nature that is resistant to oil and grease. Its axial aperture 36 is of such size as to admit the pivot pin 11 with an easy sliding fit. The outside diameter of the disc 26 is the same as the diameter of the disc 25 across the inner arcuate faces of the its flanges 32, the arrangement being such that the disc 26 is positionable in laterally abutting relation to disc 25, the flanges 32 of the latter extending substantially all the way across the peripheral face of the disc 26. One lateral face of the disc 26 is formed with two annular grooves 37, 38 that are concentric with the axis of the disc, and the opposite side of the disc is formed with a single annular groove 39, Figs. 1 and 2, that is disposed intermediate grooves 37, 38. The presence of said grooves enables substantial deformation or displacement of the composition of the disc 26 when it is subjected to axially directed compressive stress during use. The member 27 is an annular sheet metal disc that is identical with the member 25 except that it lacks the dowels 34 of the latter. It comprises laterally extending marginal flanges 41, 41, and in the assembled condition of the device 27 is in laterally abutting relation to the resilient disc 26, its flanges 41 substantially spanning the periphery of said disc 26 and disposed between flanges 32 of disc 25, in intercalated relation with the latter. The arrangement is such as to prevent relative angular oscillating movement between discs 25 and 27, but to enable relative axial movement of the discs toward each other against the resistance of the intervening resilient disc 26, or away from each other under impetus of said disc 26 when deforming pressure on the latter is relieved.

The member 28 is an annular disc of friction material, specifically porous graphite bronze. The outside diameter of disc 28 is the same as disc 26, and it is provided with an axial aperture 43 that is substantially larger than the pivot pin 11 so as to provide an appreciable space therebetween. Both lateral faces of the disc 28 are formed with arcuate oil or grease grooves 44, 44 that open into the axial aperture 43, the outer ends of the grooves being spaced inwardly from the periphery of the disc.

The member 29 is an annular sheet metal disc that is formed on one lateral face with dowels or lugs 46, 46 that may be identical with the dowels 34 of the disc 25. The outside diameter of disc 29 preferably is the same as the greatest outside diameter of the discs 25 and 27, but the disc 29 is not formed with lateral flanges, such as the flanges 32, 41 of the previously described discs. The disc 29 is formed with an axial aperture 47 that is substantially the same diameter as the aperture 43 in friction disc 28.

The assembled friction device 20, comprising the several elements 24 to 29 as described, is mounted upon the pivot pin 11, between a link 10 and the member 12, with the disc 25 confronting the link 10 and the disc 29 confronting the member 12. To this end the link 10 is formed with a plurality of recesses or sockets 50, 50 in which the dowels 34 of disc 25 are receivable, and the member 12 is formed with a similar series of sockets 51, 51 in which the respective dowels of disc 29 are receivable. The space between the link 10 and member 12 is less than the thickness of the assembled device 20 so that when operatively positioned the resilient disc 26 of the latter is under compressive stress. The arrangement is such that relative oscillatory movement of link 10 and member 12 will produce similar relative oscillatory movement of the disc 25 and disc 29. Since disc 27 is mechanically interlocked with disc 25 through the agency of the flanges 32, 41, it follows that disc 27 will oscillate with disc 25, whereby the lateral faces of friction disc 28 are subjected to the friction of the oppositely oscillating discs 27, 29. The feature of having the axial apertures of discs 28, 29 somewhat larger than the pivot pin 11 enables grease or oil discharged from an end of grease groove 19 to reach the grease grooves 44 of the friction disc and thus to lubricate the friction faces thereof.

It will be seen that the invention provides an efficient and compact friction device that requires no adjustment after once being placed in service, that utilizes both faces of the friction element 28 thereby obtaining a relatively large area of friction surface, and which is well suited for use in situations wherein there is axial thrust of one of the relatively oscillating elements, such as the element 12 shown herein.

The friction device 21, which is positioned on the opposite side of member 12, between the latter and the other link 10 in many respects is similar to friction device 20 and may employ some of the elements of the latter. Said device 21 comprises a circumferential band 54 of elastic material that is similar to the band 24 previously described and serves a similar purpose, said band 54 differing from band 24 by being of narrower width. The device 21 includes a friction disc 28 such as previously described, said disc 28 being coaxially positioned between two annular metal discs 29 and 55, the latter being identical with disc 29, which previously has been described, except that its axial aperture is smaller so as to have a close fit about the pivot pin 11. The disc 55 also is formed with a series of laterally projecting dowels 56, 56 similar to the dowels 46 of disc 29.

The device 21, assembled as shown in Fig. 1, is positioned between the element 12 and link 10 with the disc 29 abutting the element 12 and its dowels 46 seating in respective sockets 58 formed in the latter, the disc 55 abutting link 10 and having its dowels 56 received in respective sockets 59 formed in said link. The device 21 receives lubricant from the grease groove 19 in the same manner as does friction device 20.

It will be obvious that upon relative oscillating movement of the links 10 and member 12, both discs 29, 55 will move relatively of the friction disc 28, in the same manner as in friction device 20. The device 21 is designed especially for use in combination with friction device 20 as shown, whereby the expansive force of the resilient disc 26 of friction device 20 will be transmitted to the member 12 and through the latter to the friction device 21, with the result that pressure is exerted at all times on the friction disc 28 of the latter.

Although the friction devices 20, 21 are constructed and arranged to be lubricated, as required, by means of lubricant distributed thereto through the pivot pin 11, said friction devices may with equal facility be made to be self-lubricating. Such modification is effected by the substitution of self-lubricated friction discs 60 for the friction discs 28 of the previously described embodiments. As shown in Fig. 4, a friction disc 60 comprises an axially apertured disc-like body 61 of resilient rubber or rubber-like composition having a facing on its respective lateral surfaces composed of woven friction material 62, which facing may cover its peripheral face, as shown, if desired. The friction facing 62 preferably is impregnated with a waxy thixotropic lubricant comprising castor oil or a castor oil derivative.

All embodiments of the invention are characterized by having a greater dynamic coefficient of friction than static coefficient of friction; that is, the devices of the invention offer less resistance or friction to the initiation of movement between two relatively movable elements than to subsequent relative movement thereof. This obviates the objectionable "break away" effect that is noticeably present in some friction devices, and results in smoother operation.

Modification may be resorted to without departing from the spirit of the invention or the scope thereof as defined by the appended claims.

I claim:

1. In a friction device of the character described, the combination of a plurality of disc-like elements including a friction element arranged co-axially in laterally abutting relation, and an elastic band under tension extending circumferentially about all of said disc-like elements.

2. In a friction device of the character described, the combination of a plurality of disc-like elements including a friction element arranged co-axially in laterally abutting relation, and an elastic band extending circumferentially about all of said disc-like elements and formed with inwardly extending marginal flanges positioned against the exposed faces of the outermost discs of the structure, said band being under circumferential and transverse tension.

3. In a friction device of the character described, the combination of a plurality of disc-like elements including a friction element arranged co-axially in laterally abutting relation, and resilient means under tension engaging the outermost elements of said group of elements and urging them toward each other to compact the assembled structure.

4. A combination as defined in claim 3 including dowels formed on and projecting laterally from the outermost discs of the device, said dowels being receivable in respective sockets formed in a pair of elements having relative oscillatory movement and relative axial thrust, and between which the device may be positioned.

5. A friction device of the character described adapted to be positioned between a pair of elements having relative oscillatory movement, said device comprising a metal plate adapted to be oscillated by one of said relatively moving elements a friction disc in laterally abutting relation to said plate, a metal plate on the opposite side of said friction disc and laterally abutting the same, said last mentioned plate adapted to be oscillated by the other relatively moving element, and a resilient member supported solely by said plates and normally yieldingly urging them toward each other and toward said friction disc.

6. A combination as defined in claim 5 wherein the resilient member is an elastic band encircling the device and formed with inwardly extending marginal flanges engaging the outer lateral faces of the metal plates, said band being under longitudinal and transverse tension.

7. In a friction device adapted for use between a pair of relatively oscillating elements, the combination of a metal plate adapted to be oscillated by one of said relatively oscillating elements, a friction disc in laterally abutting relation to said metal plate, a second metal plate on the opposite side of said friction disc and laterally abutting the latter, a third metal plate spaced laterally from said second metal plate and adapted to be oscillated by the other relatively movable element, a deformable disc of resilient material disposed between the second and third metal plates enabling relative axial movement therebetween, and means providing driving connection between the second and third metal plates whereby oscillatory movement of the third plate is translated to the second plate.

8. A combination as defined in claim 7 wherein the last mentioned means consists of projections formed on the second and third plates, said projections extending laterally into driving engagement with each other.

9. A combination as defined in claim 7 wherein the last mentioned means consists of laterally projecting marginal flanges formed on the second and third plates, the flanges of one plate being intercalated with the flanges of the other plate.

10. In a friction device adapted for use between a pair of elements oscillating relatively about an axis, the combination of an annular metal plate concentric with said axis and adapted to be oscillated by one of said relatively movable members, a co-axial friction disc in laterally abutting relation to said plate, a second metal plate on the opposite side of said friction disc and laterally abutting the latter, a third metal plate in axially spaced relation to the second plate and adapted to be oscillated by the other relatively movable element, said second and third plates having mechanical interengagement whereby the third plate can oscillate the second plate, and yielding means disposed between the second and third plates enabling relative axial movement therebetween.

11. A combination as defined in claim 10 including an elastic band under tension circumscribing the assembled elements of the device and engaging the exposed lateral faces of the outermost of said elements.

ROY W. BROWN.